United States Patent Office 3,487,051
Patented Dec. 30, 1969

3,487,051
POLYAMIDE-IMIDAZOPYRROLONE CONDENSATION POLYMERS
Munehiko Suzuki, Yokosuka-shi, Etsuo Hosokawa, Yokohama, and Shinsuke Hirata and Tetsuo Hoshino, Kawasaki-shi, Japan, assignors to Showa Electric Wire and Cable Co., Ltd., Kawasaki-shi, Japan, a corporation of Japan
No Drawing. Filed Jan. 10, 1967, Ser. No. 608,252
Claims priority, application Japan, Feb. 12, 1966, 41/8,522
Int. Cl. C08g 41/02
U.S. Cl. 260—78   1 Claim

ABSTRACT OF THE DISCLOSURE

The present disclosure is directed to a novel class of polyamide-imidazopyrrolone condensation copolymers with improved thermal stability and mechanical and electrical properties, and to a process for the production thereof. It has been found that a novel class of polyamide-imidazopyrrolone condensation copolymers can be prepared by a series of steps of reacting dinitro-mono acid halide with dinitro-mono amine to give tetra-nitro compound having an amide linkage, reducing the tetra-nitro compound to the corresponding tetra-amine compound and further reacting the tetra-amine compound with tetra-carboxylic anhydride, and that the present polyamide-imidazopyrrolone condensation copolymer are very useful in various applications of wire-coating, laminates, films, molding and the like because of their excellent thermal stability and improved mechanical and electrical properties.

BACKGROUND OF THE INVENTION

This invention relates to a novel class of polyamide-imidazopyrrolone condensation copolymers with improved thermal stability and mechanical and electrical properties, and is directed to a proces for producing such copolymers on an industrial scale.

In the field of electric insulator, it has strongly been desired to improve the thermal stability of employed synthetic resins as well as other mechanical and electrical properties thereof. Recently, various kinds of synthetic resins with improved thermal stability have been developed. For example, in NASA TN D-3148, there are described a series of polyimidazopyrrolone condensation polymers prepared by reacting tetra-carboxylic dianhydrides such as pyromellitic dianhydride and 3,3',4,4'-benzophenone tetracarboxylic dianhydride, with tetra-amines such as 1,2,4,5-tetra-amino benzene and 3,3',4,4'-tetra-amino diphenyl ether, in solvents. However, these condensation polymers, in spite of having improved thermal stability, possess poor mechanical properties such as flexibility and the like.

Accordingly, a principal object of the present invention is to provide a novel class of imidazopyrrolone condensation polymers having improved mechanical properties as well as thermal stability.

Another object of this invention is to provide a process of preparing such polymers.

These and other objects and advantages of the present invention will become apparent to those skilled in the art from a consideration of the following specification and claims.

SUMMARY OF THE INVENTION

The condensation copolymers of the invention are characterized by the following repeating unit:

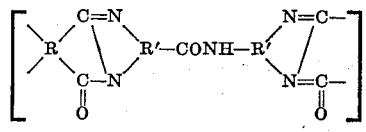

wherein R is a member selected from the group consisting of >CHCH<,

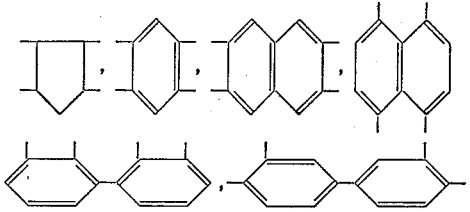

and

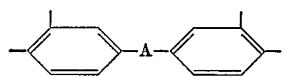

in which A is —O—, —S—

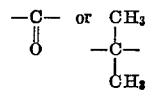

and R' is a member selected from the group consisting of

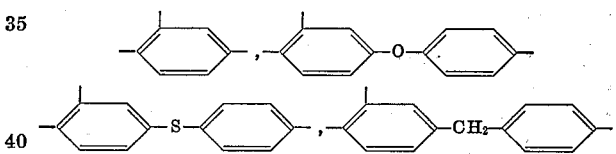

and

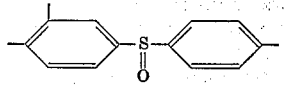

the two free valences of one benzene ring of said R' being connected to two nitrogen atoms of the formula, thereby forming an imidazopyrrolone nucleus.

In accordance with this invention, it has been found that such copolymers can successfully be prepared, as shown hereinunder, by a series of steps of reacting dinitro-mono acid halide of the Formula A

wherein R' has the same meaning as defined previously and X is chlorine or bromine atom with chemical equivalent amounts of dinitro mono amine of the Formula B

wherein R' has the same meaning as defined above to give tetra-nitro compound of the general Formula C

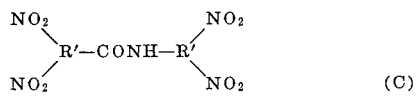
(C)

reducing the tetra-nitro compound to give tetra-amine compound, and further reacting the amine compound with chemical equivalent amounts of tetra-carbocylic dianhydride of the Formula D

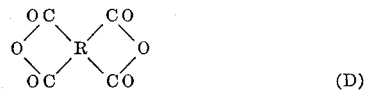
(D)

wherein R has the same meaning as defined previously.

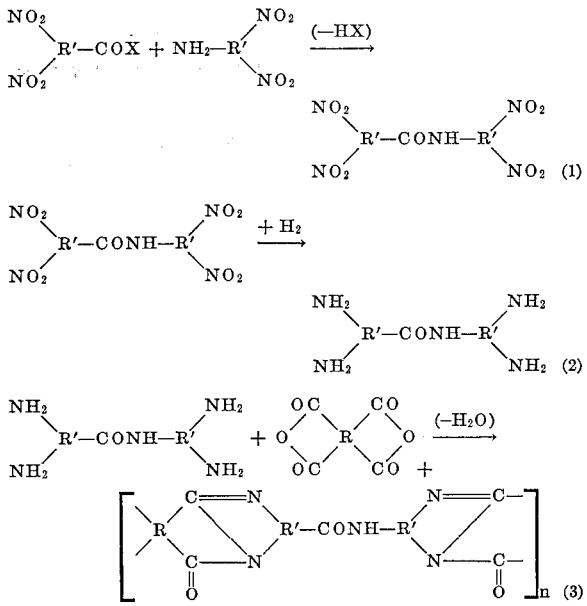

In the above reaction Formula 3, $n$ is a positive integer representing the polymerization degree of the polymer product.

In carrying out the present method, the dinitro-mono-amine (B) is first dissolved in water with or without weak acid such as acetic acid, an alkali catalyst such as sodium hydroxide and potassium hydroxide is added thereto, and the dinitro-mono acid halide (A) needed for proper stoichiometry to complete the reaction is then dropped into the resulting solution, while being vigorously stirred as such or in the form of a solution in an organic solvent such as xylene, benzene and toluene. Precipitated tetra-nitro compound is separated, washed with, in the order of, diluted alkaline aqueous solution, diluted hydrochloric acid solution and water, and dried at about 150° C. for 24 hours.

Thus obtained tetra nitro compound (C) is then dissolved in a proper solvent such as, for example, γ-butyrolactone-ethanol, cyclohexanone-ethanol, 4-phenyl-1, 3-dioxane-ethanol and the like, and hydrogenated in the presence of reduction catalyst, (e.g. Ni, Zn, Pt, Pd or Fe series catalysts) to give the corresponding tetra amine.

Upon heating the tetra-amine with an equimolar amount of tetra-carboxylic dianhydride with or without solvent, the objective poly-amide-imidazopyrrolone condensation copolymer can be obtained.

The dinitro-mono acid halides adapted for use in the practice of this invention include m,p-dinitrobenzoyl chloride, 3,4-dinitro-4'-chloroformyl diphenyl ether, 3, 4-dinitro-4'-chloroformyl diphenyl methane, 3,4-dinitro-4'-bromoformyl diphenyl sulfide, 3,4-dinitro-4'-bromoformyl diphenyl ketone, 3,4-dinitro-4'-chloroformyl diphenyl sulfoxide, 3,4-dinitro-4'-bromoformyl diphenyl methane, m,p-dinitro-benzoyl bromide and the like. Typical examples of the dinitro-mono-amines may include m,p-dinitro aniline, 3,4-dinitro-4'-aminodiphenyl ether, 3,4 - dinitro - 4'-aminodiphenyl sulfide, 3,4-dinitro-4'-aminodiphenyl ketone, 3,4-dinitro-4'-aminodiphenyl methane, 3,4-dinitro-4'-aminodiphenyl sulfoxide and the like.

As for the tetra-carboxylic dianhydrides employed in the practice of this invention, the following may successfully be utilized: pyromellitic dianhydride, cyclopentane tetra-carboxylic dianhydride, 2,3,6,7-naphthalene tetracarboxylic dianhydride, 1,4,5,8-naphthalene tetra-carboxylic dianhydride, 2,2',3,3'-diphenyl tetra-carboxylic dianhydride, 3,3',4,4'-diphenyl tetra-carboxylic dianhydride, bis(3,4-dicarboxy phenyl) ether dianhydride, bis(3,4-dicarboxy phenyl) sulfone dianhydride, 2,2-bis(3,4-dicarboxy phenyl) propane dianhydride, 3,3',4,4'-benzophenone tetra-carboxylic dianhydride, ethylene tetra-carboxylic dianhydride and the like.

In the above said reaction (3), thorough attention should be paid to the control of employing amounts of each ingredient and of temperature elevating rate since each of the factors has a great influence on the reaction yield thereof. For example, in the case when a larger excess amount of tetra-carboxylic dianhydride is employed over the stoichiometric amount for the reaction with tetra-amine, the following reaction (4) may principally proceed in place of the reaction (3), thereby resulting in the imide compound shown below.

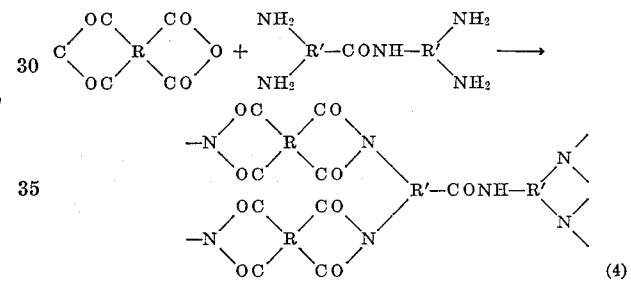
(4)

On the other hand, if the tetra amine is in large excess of the stoichiometric amount to complete the reaction with tetra-carboxylic dianhydride, the following reaction (5) may surpass the abovesaid reaction (3), and result the formation of imidazole compound as shown below.

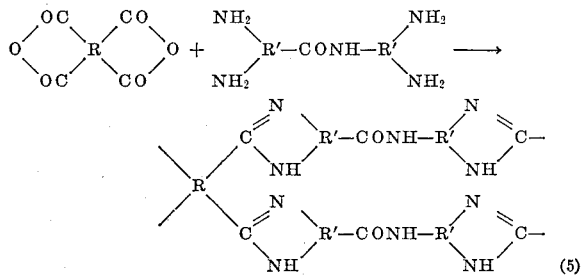
(5)

When the aforesaid reaction is carried out without employing any solvent, too rapid elevation of reaction temperature will impede the smooth process of the reaction (3) and cause the side-reactions (4) and (5), and therefore such a rapid temperature elevation should be carefully avoided. From these findings, it is desirable to employ adequate amounts of reaction ingredients, the amount of one ingredient being at most in 20% excess than that of the other, and to employ an appropriate temperature elevating rate, the preferable range being 2–3° C. per minute.

In a preferred embodiment of the present method employing no solvent, equimolar amounts of tetra-carboxylic dianhydride and tetra amine are placed in a reaction vessel equipped with mechanical stirrer, and while stirring and introducing inert gas (e.g. nitrogen gas) therein, the mixture is gradually heated up to 140–250° C. with care that the temperature of the reaction mixture is elevated at a rate of 2–3° C. per minute. Thereafter, the introduction of inert gas is stopped and the reaction mixture is further heated at 200–300° C. under a vacuum of about 0.1 mm. Hg, for 2–3 hours. Thus produced reaction mass is then dissolved in an organic polar solvent such as, for example, dimethyl acetamide, dimethyl formamide, N-methyl-2-pyrrolidone, and the like, and poured into aqueous ethanol solution (50:50) to precipitate polyamide-imidazopyrrolone condensation copolymer.

In another embodiment of the present method employing equimolar amounts of tetra-carboxylic dianhydride and tetra amine are dissolved in an organic solvent such as, for example, pyridine, dimethyl acetamide, and N-methyl-2-pyrrolidone, or in an inorganic solvent such as, for example, poly phosphoric acid, and the reaction mixture is, under substantially anhydrous conditions, refluxed, while introducing or not introducing inert gas (e.g. nitrogen) therein, for 2–10 hours, and thereafter treated in the same ways as described above to obtain the precipitations of objective compound. Thus obtained polyamide-imidazopyrrolone condensation copolymer is characterized by having extremely improved thermal stability, oxidation stability, good film-forming properties and improved toughness, and is useful for various applications such as, for example, wire-coating, molding, laminate, film, coating composition or the like.

The condensation copolymer solution obtained by the method of this invention may successfully be employed if desired, as it is, i.e. without isolating the copolymer from other side reaction products or without further purifying the copolymer, for the aforesaid purposes, or can be added with other synthetic resins.

EXAMPLES OF THE INVENTION

The following are the examples of the present method and the present copolymers, but it is to be understood that these are only for illustrating the present invention and not for limiting in any sense. Unless otherwise noted, the parts therein are by weight.

Example 1

22.8 grams of 3,4-dinitro-4'-amino-diphenyl methane and 4.0 grams of sodium hydroxide were dissolved in aq. acetic acid solution, and under vigorous stirring 18.5 grams of m,p-dinitro-benzoylchloride were added thereto. Thus reacted and precipitated tetra nitro compound was separated, washed in subsequent order with diluted aqueous sodium hydroxide solution, diluted hydrochloric acid solution and water, and dried at 150° C. for 24 hours.

Thus obtained tetra-nitro compound was dissolved in a mixed solvent of γ-butyrolactone (1 part, by weight) and ethanol (10 parts, by weight), and the solution was hydrogenated in the presence of Raney Ni catalyst to give tetraamine compound having amide linkage.

17.3 grams of the tetra amine and 10.8 grams of pyromellitic dianhydride were then placed in a reaction vessel, and the mixture was, under nitrogen gas stream, gradually heated up to 200° C., with the care that the temperature of the mixture was elevated at a rate of 2° C. per minute, and thereafter the said tempertaure was maintained under 0.1 mm. Hg for 3 hours to complete the reaction. Thus produced reaction mass was dissolved in dimethylsulfoxide, and poured in a mixture of water and ethanol (50:50) to precipitate and purify the product. After separating and drying the product, thus obtained polyamide-imidazopyrrolone condensation copolymer was dissolved in a mixed solvent consisting of 60 parts, by weight, of N-methyl-2-pyrrolidone and 40 parts, by weight, of dimethyl acetamide, to prepare a varnish-like resinous solution containing 20%, by weight, of resin. The solution of the resin has absolute viscosity of 15–25 poise (30° C.). This solution was coated on a copper plate, and the plate was dried at 250° C. for 10 minutes, thereby obtained a good film having improved toughness and flexibility. The abovesaid solution was applied 10 times to a soft copper wire of 1.0 mm. diameter by using a conventional method with the conditions of 400–450° C. baking temperature, and 8 m./minute wire speed, and thereby obtained an enamel-insulated wire having 0.045–0.047 mm. film thickness. This enamel-insulated wire posessed various excellent properties which are shown in the following Table 1.

TABLE 1

| Tested item: | Test result |
| --- | --- |
| Abrasion resistance (NEMA method, load 700 g.) | 250 times. |
| Heat resisting impact strength (200° C.×2 hours) | Passed 1 time diameter. |
| Softening resistance (700 g.) | More than 300° C. |

Absolute viscosity aforementioned was measured by a "B-type" viscosimeter manufactured by Tokyo Keiki Seizosho, Japan, at 60 r.p.m., where a rotor is revolved in varnish by a single phase synchronous motor whereby viscosity resistance torque is measured by a spring balance.

Heat resisting impact strength employed in the above table is determined as follows: That is, an enamel wire to be tested is coiled round on a series of round bars each having integral times diameter as compared with that of the enamel wire, and these bars are heated at 200° C. for 2 hours. Thereafter, each enamel wire is examined whether it has cracks thereon, and the finest round bar having an unaffected enamel wire is determined.

For the softening resistance test, two pieces of enamel wire are placed crosswise between two glass plates loaded with 700 grams weight, these wires are gradually heated by an appropriate means such as electric means, and the temperature at which the enamel coating of each wire is softened and the wires are contacted to each other is determined. All test values hereinafter are determined by the same procedures as above.

Example 2

13.7 grams of m,p-dinitroaniline and 4.0 grams of sodium hydroxide were dissolved in water and placed in a reaction vessel. While vigorous stirring, a xylene solution of 27.8 grams of 3,4-dinitro-4'-chloroformyl diphenyl ether was added dropwise thereto, and precipitated tetranitro compound was separated, washed in order with diluted aqueous sodium hydroxide solution, diluted aqueous hydrochloric acid solution and water, and finally dried at 150° C. for 24 hours. This tetra-nitro compound was then dissolved in a mixed solvent of 3 parts of γ-butyrolactone and 20 parts of ethanol, and hydrogenated in the presence of Raney Ni catalyst to give the corresponding tetra-amine compound. 17.1 grams of this obtained tetra-amine and 16.1 grams of 3,3',4,4'-benzophenone tetra-carboxylic dianhydride were dissolved in dimethyl acetamide and placed in a reaction vessel. While introducing nitrogen gas in the vessel, the mixed solution was reacted at 170° C. for 5 hours. Thus obtained polyamide-imidazopyrrolone resin solution was further added with an appropriate amount of N-methyl-2-pyrrolidone to adjust the resinous content in the solution to 20%, by weight, the total weight. Absolute viscosity of this solution was 25–40 poise (30° C.). This varnish-like resinous solution was coated on a copper plate and dried at 200° C. for 15 minutes, thereby obtained a film having excellent toughness and flexibility.

Example 3

17.3 grams of the tetra-amine obtained by the method of Example 1 and 13.8 grams of 2,3,6,7-naphthalenetetracarboxylic dianhydride were mixed well and put portion by portion in pyridine placed in a reaction vessel, and the combined mixture was reacted at 170° C. for 5 hours. Thus obtained polyamide-imidazopyrrolone resin solution was added with an appropriate amount of N-methyl-2-pyrrolidone to adjust the resinous content of the solution to 20%, by weight, the total weight. Absolute viscosity of the solution was 25–40 poise (30° C.). Glass cloth was immersed in the resinous solution and then baked at 200–300° C. to give polyamide-imidazopyrrolone impregnated glass cloth.

Example 4

17.1 grams of the tetra-amine obtained by the method of Example 2 and 8.5 grams of ethylene tetra-carboxylic dianhydride were reacted in the same way as disclosed in Example 1, and polyamideimidazopyrrolone condensation copolymer was obtained. The copolymer was dissolved in N-methyl-2-pyrrolidone to prepare a varnish-like resinous solution (resin 20%) whose absolute viscosity was 5–20 poise (30° C.).

Example 5

Employing the same procedures as described in Example 1, 14.4 grams of 3,4-dinitro-4'-amino-diphenyl ketone and 17.2 grams of 3,4-dinitro-4'-bromoformyl-diphenyl sulfide were reacted to obtain tetramine compound having amide linkage therein.

23.0 grams of thus obtained tetra-amine compound were reacted with 14.7 grams of 3,3',4,4'-diphenyl tetra-carboxylic dianhydride according to the procedure described in Example 2 to give polyamide-imidazopyrrolone condensation copolymer.

Example 6

21.4 grams of the tetra-amine obtained by the method of Example 5 and 18.8 grams of 2,2-bis(3,4-dicarboxyphenyl)propane dianhydride were reacted in the same way as described in Example 2 and obtained polyamide-imidazopyrrolone condensation copolymer therefrom.

Example 7

Employing the same procedures as described in Example 1, tetra-amine compound was prepared from 22.9 grams of 3,4-dinitro-4'-amino-diphenyl ether and 27.7 grams of 3,4-dinitro-4'-chloroformyl diphenyl methane.

21.9 grams of thus obtained tetra-amine compound and 10.9 grams of pyromellitic dianhydride were reacted as in Example 2 to obtain polyamide-imidazopyrrolone condensation copolymer.

To each of the condensation copolymers obtained in Examples 5–7 a solvent of M-methyl-2-pyrrolidone was added, to prepare a varnish-like resinous solution containing 20% resin. The solutions thus prepared and the solutions obtained in Examples 3 and 4 were respectively coated on a soft copper wire of 1.0 mm. diameter and baked as in Example 1 to obtain an enamel insulated wire.

The characteristics of these wires were shown in Table 2.

in the form of a solution. Dimethyl sulfoxide was added to the copolymer to prepare a varnish-like resinous solution (resin 20%, absolute viscosity 5–15 poise at 30° C.).

Example 10

Employing the same procedures as in Example 1, tetra-amine compound was prepared from 9.2 grams of m,p-dinitro-aniline and 11.5 grams of m,p-dinitro benzoyl chloride, where a mixed solvent of 2 parts of cyclohexanone and 10 parts of ethanol was employed in place of the solvent consisting of 1 part of γ-butyrolactone and 10 parts of ethanol at the time of reducing nitro radicals to amino radicals.

12.9 grams of thus obtained tetra-amine were then reacted with 8.9 grams of 2,2',3,3'-diphenyl tetracarboxylic dianhydride and 4.3 grams of ethylene tetra-carboxylic dianhydride as in Example 2 to obtain polyamide-imidazopyrrolone condensation copolymer. In this case, polyphosphoric acid was employed as a reaction solvent. To the copolymer obtained above, dimethyl sulfoxide was added to prepare a varnish-like resinous solution (resin 20%, absolute viscosity 30–60 poise at 30° C.).

Example 11

8.7 grams of the tetra-amine employed in Example 1 and 8.6 grams of the tetra-amine employed in Example 2 were reacted with 16.8 grams of 2,2-bis(3,4-dicarboxyphenyl)propane dianhydride, as in Example 2, and polyamide-imidazopyrrolone condensation copolymer was prepared.

The varnish-like resinous solutions obtained in Examples 8–10 and a varnish-like resinous solution (resin 20%) prepared by adding dimethyl sulfoxide solvent to the copolymer of Example 11 were coated onto a copper plate and dried at 250° C. for 10 minutes to prepare films which are tough and superior in flexibility.

Example 12

Employing the same procedures as described in Example 1, a mixture of tetra-amines each having amide linkage was prepared from 13.8 grams of 3,4-dinitro-4'-amino-diphenyl ether, 19.4 grams of 3,4-dinitro-4'-bromoformyl diphenyl sulfoxide and 9.2 grams of m,p-dinitroaniline.

21.3 grams of thus prepared mixed tetra-amine were reacted with 13.8 grams of 1,4,5,8-naphthalene tetra-carboxylic dianhydride as in Example 1 to obtain the corresponding polyamide-imidazopyrrolone condensation copolymers. The resin was, without separating each product, directly diluted with pyridine to prepare a coating resinous solution.

TABLE 2

| Example No | 3 | 4 | 5 | 6 | 7 |
|---|---|---|---|---|---|
| Abrasion resistance (NEMA method, load 700 g.). | 240 times | 200 times | 255 times | 270 times | 230 times. |
| Heat resisting impact strength (200° C.×2 hrs.). | Passed 1 time diam. | Passed 1 time diam. | Passed 1 time diam. | Passed 1 time diam. | Passed 1 time diam. |
| Softening resistance (700 g.) | More than 300° C | More than 280° C | More than 300° C | More than 300° C | More than 300° C. |

Example 8

Employing the same procedure as described in Example 2, 14.6 grams of 3,4-dinitro-4'-aminodiphenyl sulfide and 18.9 grams of 3,4-dinitro-4'-bromoformyl-diphenyl ketone were reacted to give tetra-amine having amide linkage.

23.5 grams of thus prepared tetra-amine were then reacted with 10.5 grams of cyclopentane tetra-carboxylic dianhydride as in Example 2, thereby obtained polyamide-imidazopyrrolone condensation copolymer.

Example 9

23.5 grams of the tetra-amine obtained by the method of Example 8 were reacted with 5.5 grams of pyromellitic dianhydride and 8.2 grams of bis(3,4-dicarboxyphenyl) sulfone dianhydride as in Example 2, and polyamide-imidazopyrrolone condensation copolymer was obtained

Example 13

Employing the same procedures as described in Example 1, tetra-amine compound was obtained from 13.8 grams of m,p-dinitro-benzoyl bromide and 16.2 grams of 3,4-dinitro-4'-aminodiphenyl sulfoxide. 19.1 grams of thus prepared tetra-amine and 16.1 grams of 3,3',4,4'-benzophenone tetra-carboxylic dianhydride were reacted with each other as in Example 2, and polyamide-imidazopyrrolone condensation copolymer solution was obtained. To a part of the copolymer solution, dimethyl sulfoxide was added to prepare a varnish-like solution (resin 20%, absolute viscosity 5–15 poise at 30° C.).

Each of the condensation copolymer solutions prepared in Examples 12–13, was diluted with an appropriate amount of dimethyl sulfoxide to prepare a varnish-like resinous solution containing about 20% resin, and a glass cloth was immersed in the resinous solution and baked thereafter. In each case, a good quality polyamide-imidazopyrrolone impregnated glass cloth was obtained.

We claim:

1. A resinous polyamide-imidazopyrrolone condensation copolymer consisting essentially of the repeating structural unit:

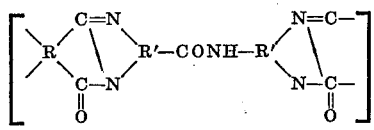

wherein R is a member selected from the group consisting of >CHCH<,

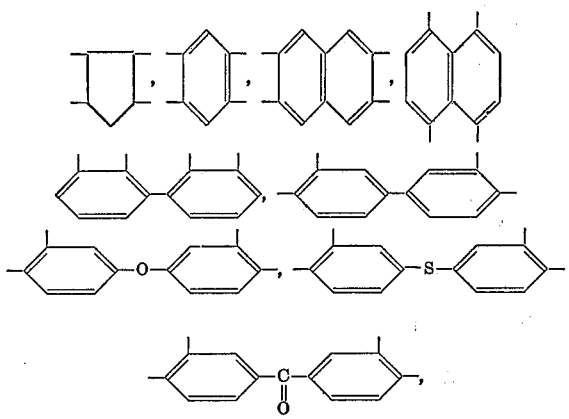

and

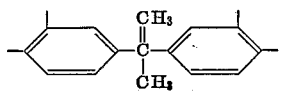

R' is a member selected from the group consisting of

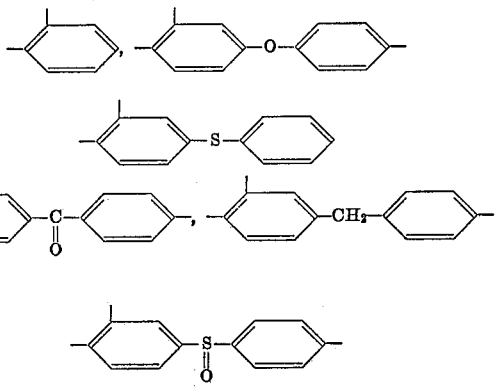

and the two free valences of one benzene ring of said R' being bonded to two nitrogen atoms of an imidazopyrrolone nucleus.

References Cited

UNITED STATES PATENTS 3,305,575 2/1967 Debarre _____ 260—454
3,414,543 12/1968 Paufler _____ 260—47

OTHER REFERENCES

Dawans et al., Polymers From Ortho Aromatic Tetra-amines and Aromatic Dianhydrides, Journal of Polymer Science, part A, vol. 3, pp. 3549–3571, October 1965.

WILLIAM H. SHORT, Primary Examiner

L. L. LEE, Assistant Examiner

U.S. Cl. X.R.

117—126, 128.4, 161; 260—30.2, 30.8, 32.6, 47, 65, 78.4